United States Patent [19]
Larson, Jr. et al.

[11] Patent Number: 5,826,517
[45] Date of Patent: Oct. 27, 1998

[54] BOGIE COUPLING SYSTEM FOR CONVERTIBLE RAILWAY-RAILROAD VEHICLE

[75] Inventors: Ernest J. Larson, Jr., 7480 W. Shore Dr., Edina, Minn. 55435; Roger D. Sims, Munster, Ind.

[73] Assignee: Ernest J. Larson, Jr., Edina, Minn.

[21] Appl. No.: 392,953

[22] PCT Filed: Aug. 8, 1994

[86] PCT No.: PCT/US94/08929

§ 371 Date: Mar. 17, 1997

§ 102(e) Date: Mar. 17, 1997

[87] PCT Pub. No.: WO96/05094

PCT Pub. Date: Feb. 22, 1996

[51] Int. Cl.⁶ .............................. B61D 3/18; B61F 3/12
[52] U.S. Cl. ......................... 105/4.3; 105/159; 410/53; 280/418.1
[58] Field of Search ................ 105/4.1, 4.2, 4.3, 105/72.2, 159, 215.1, 215.2; 410/53, 45; 280/418.1, 411.1, 415.1; 11/11

[56] References Cited

U.S. PATENT DOCUMENTS

| | | | |
|---|---|---|---|
| 4,111,451 | 9/1978 | Pinto . | |
| 4,365,820 | 12/1982 | Rush . | |
| 4,416,571 | 11/1983 | Krause | 410/53 |
| 4,547,107 | 10/1985 | Krause | 410/58 |
| 4,685,399 | 8/1987 | Baker | 105/4.1 |
| 4,718,351 | 1/1988 | Engle | 105/4.3 |
| 4,773,336 | 9/1988 | Orb | 105/199.4 |
| 4,938,151 | 7/1990 | Viens | 105/4.3 |
| 4,955,292 | 9/1990 | Cripe | 105/4.2 |
| 4,961,676 | 10/1990 | Gourdin | 410/53 |
| 5,009,169 | 4/1991 | Viens | 105/4.1 |
| 5,199,359 | 4/1993 | Bedard et al. | 105/168 |
| 5,220,870 | 6/1993 | Larson | 105/159 |

FOREIGN PATENT DOCUMENTS

| | | |
|---|---|---|
| 57242/73 | 1/1975 | Australia . |
| 483 924 A1 | 5/1992 | European Pat. Off. . |
| 1.598.994 | 8/1970 | France . |
| 961 714 | 4/1967 | Germany . |
| WO 92/00213 | 1/1992 | WIPO . |

OTHER PUBLICATIONS

The Bi–Modal RoadRailer.
RoadRailer Mark IV.

*Primary Examiner*—S. Joseph Morano
*Attorney, Agent, or Firm*—Faegre & Benson

[57] ABSTRACT

An intermodal vehicle for both highway and railway use. A bogie is rigidly and releasably connected to a trailer for supporting the trailer for transportation over a railway. The trailer has a retractable roadway tire assembly for extending and retracting roadway wheels on the underside on the trailer. When roadway wheels are extended, the trailer lifts the bogie off the ground for transporting the bogie to and from railway tracks. When roadway tires are retracted, the bogie supports the trailer for transportation over a railway.

28 Claims, 12 Drawing Sheets

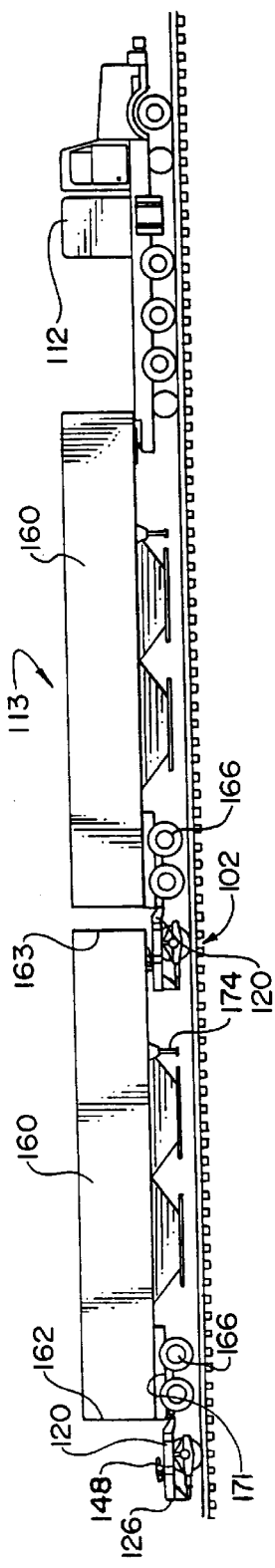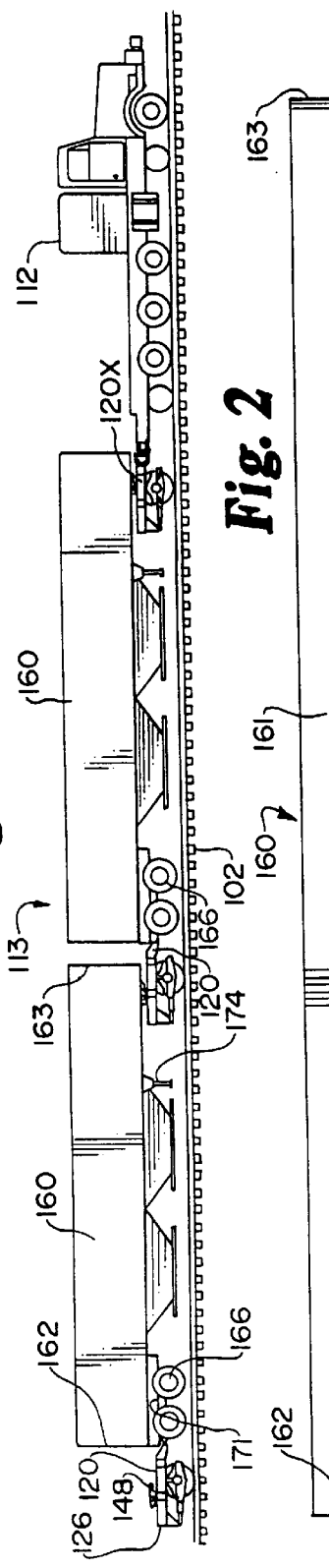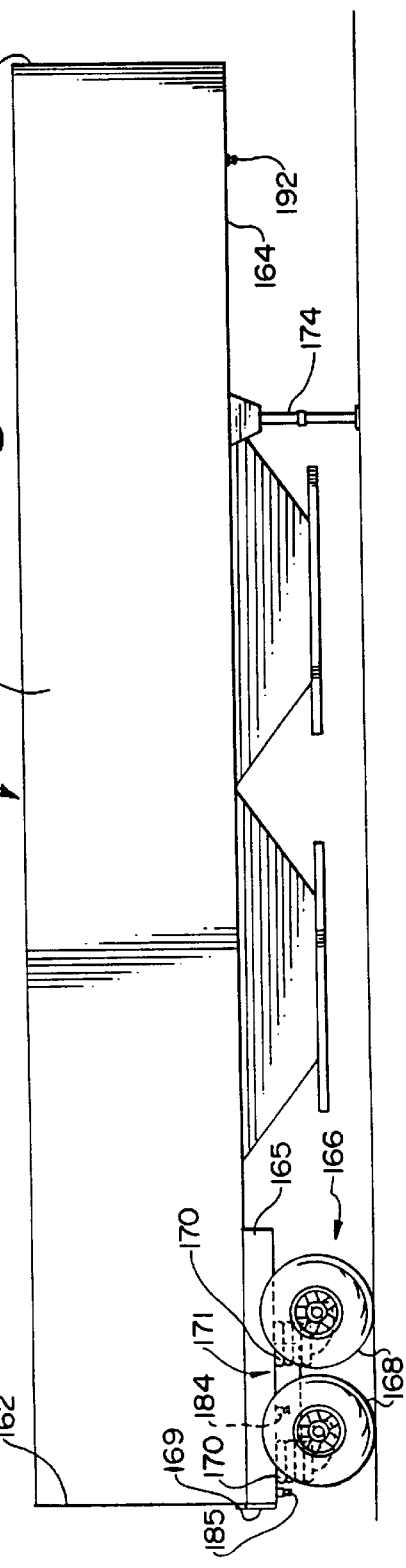

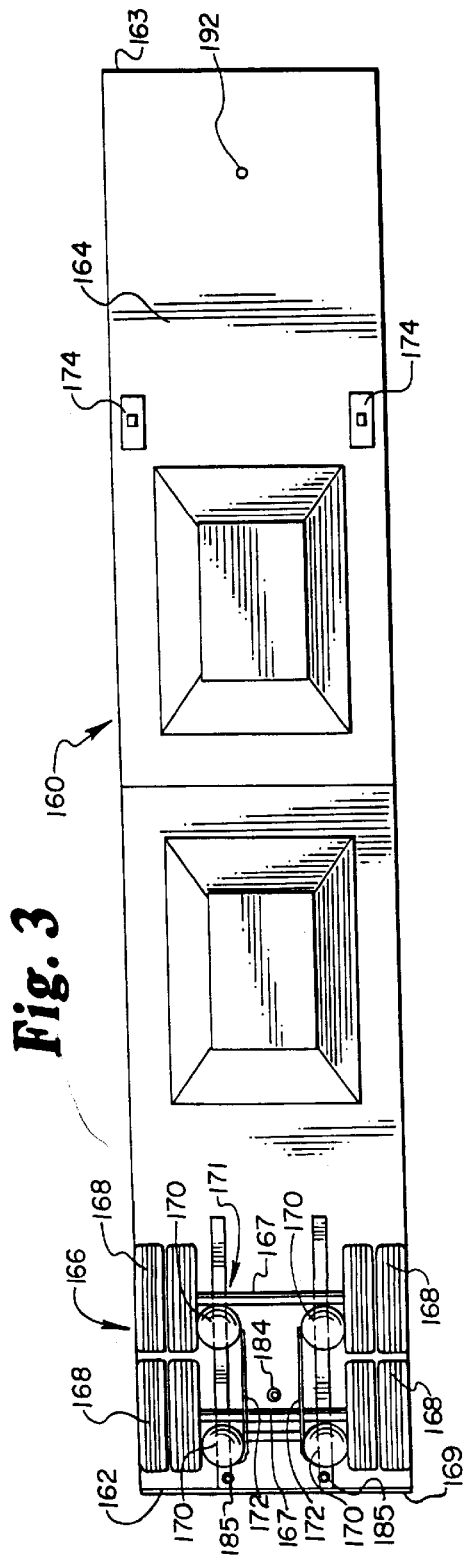
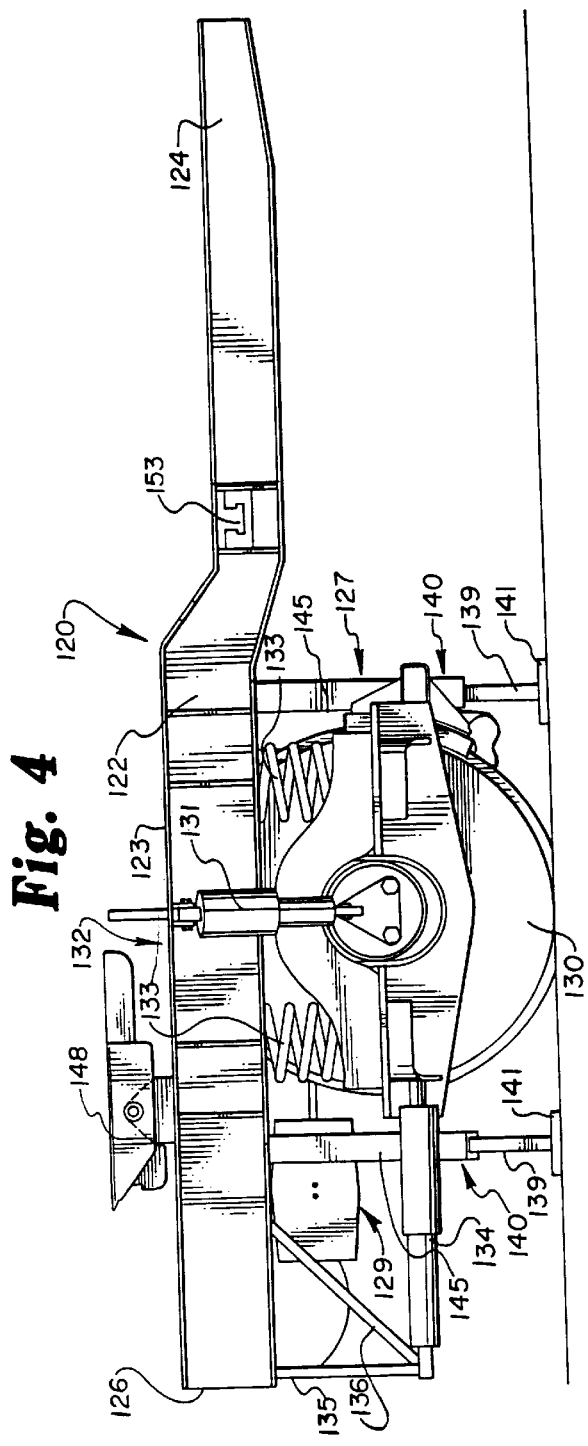

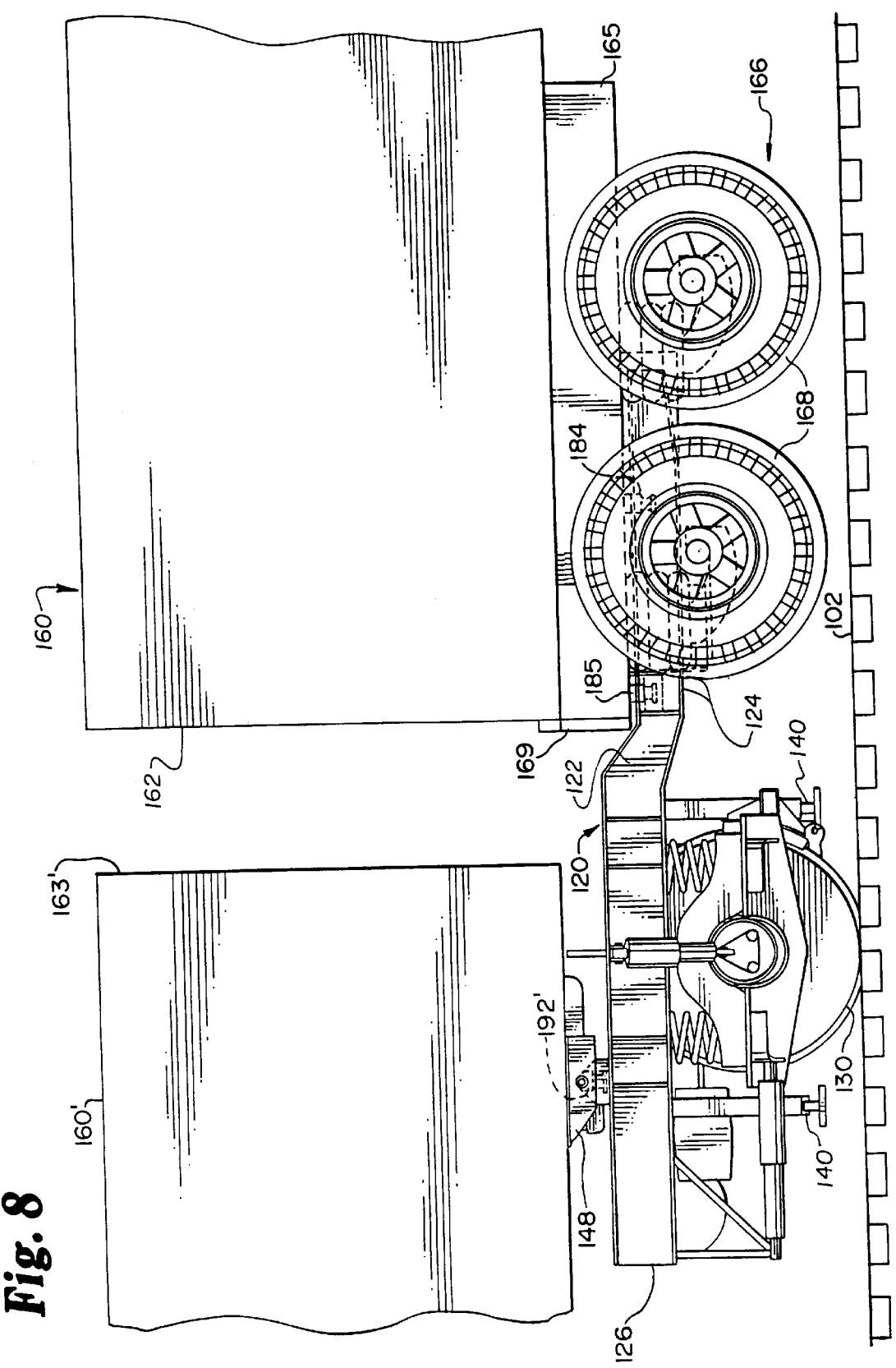

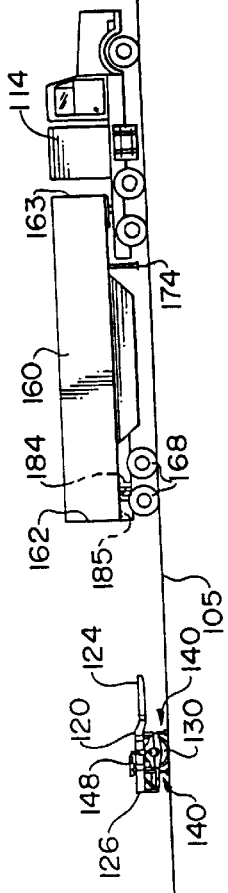
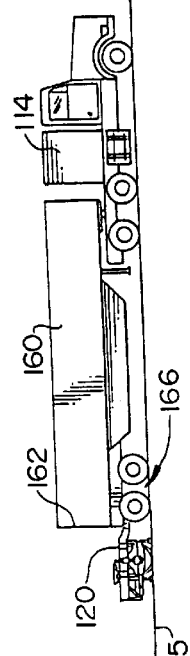
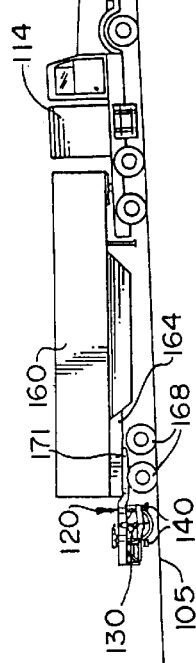
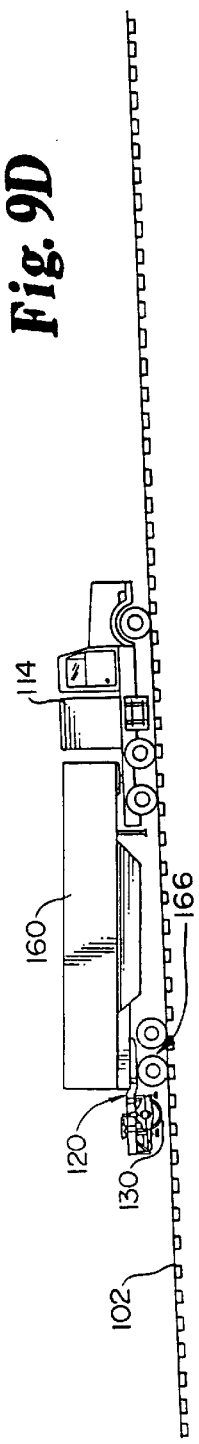
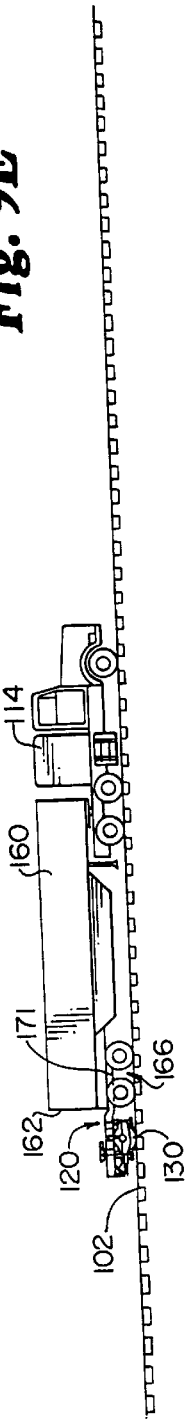
Fig. 9A
Fig. 9B
Fig. 9C
Fig. 9D
Fig. 9E

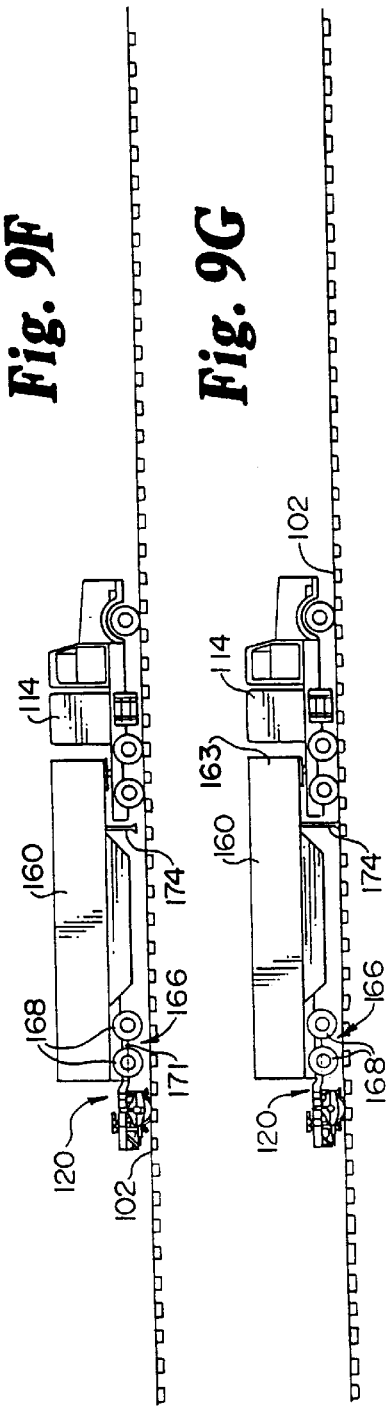

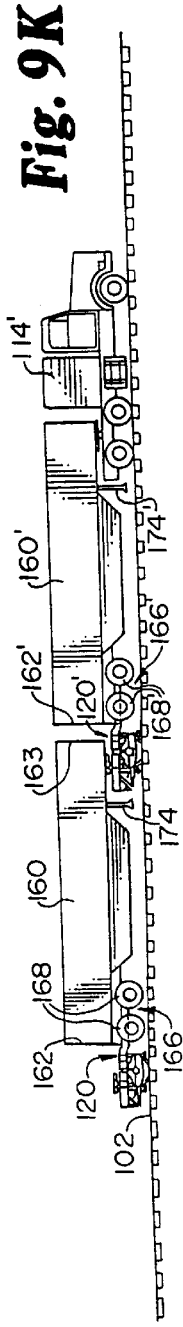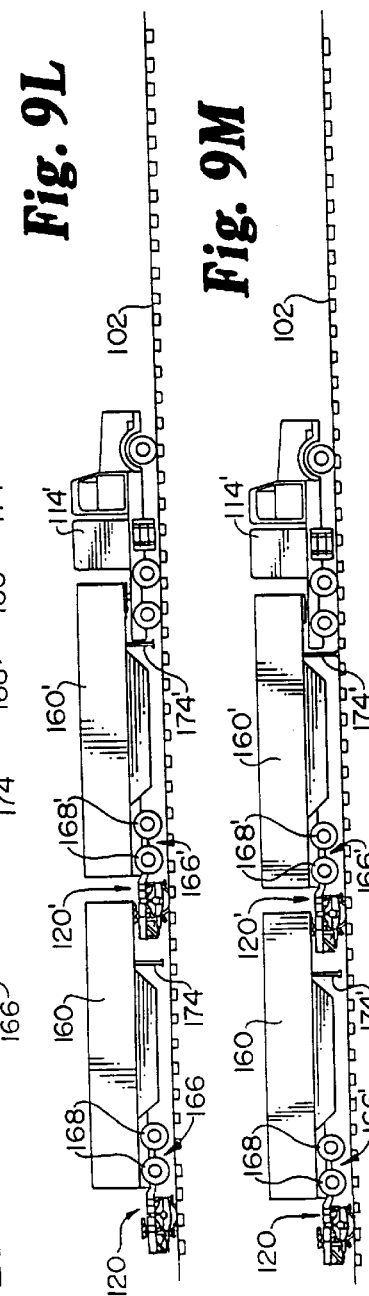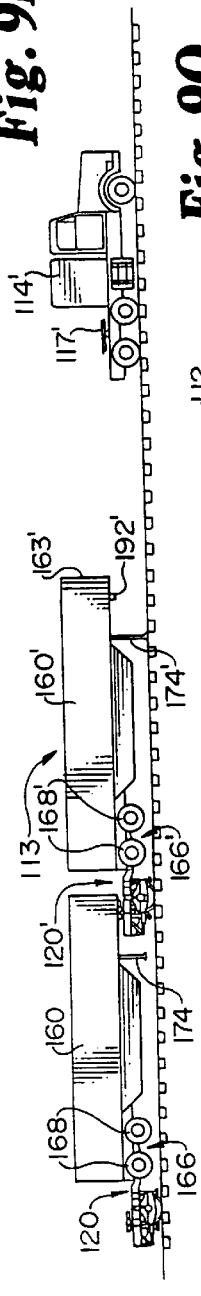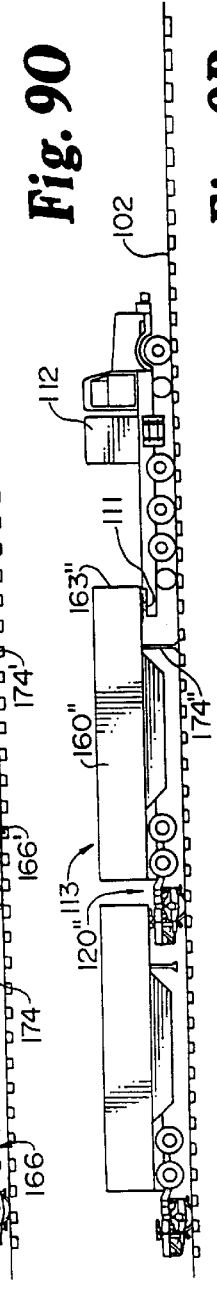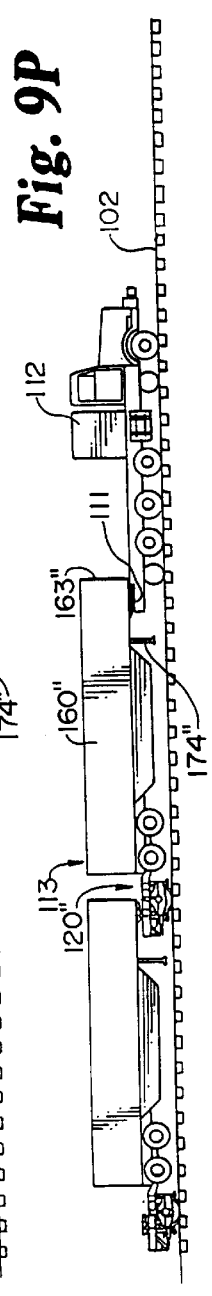

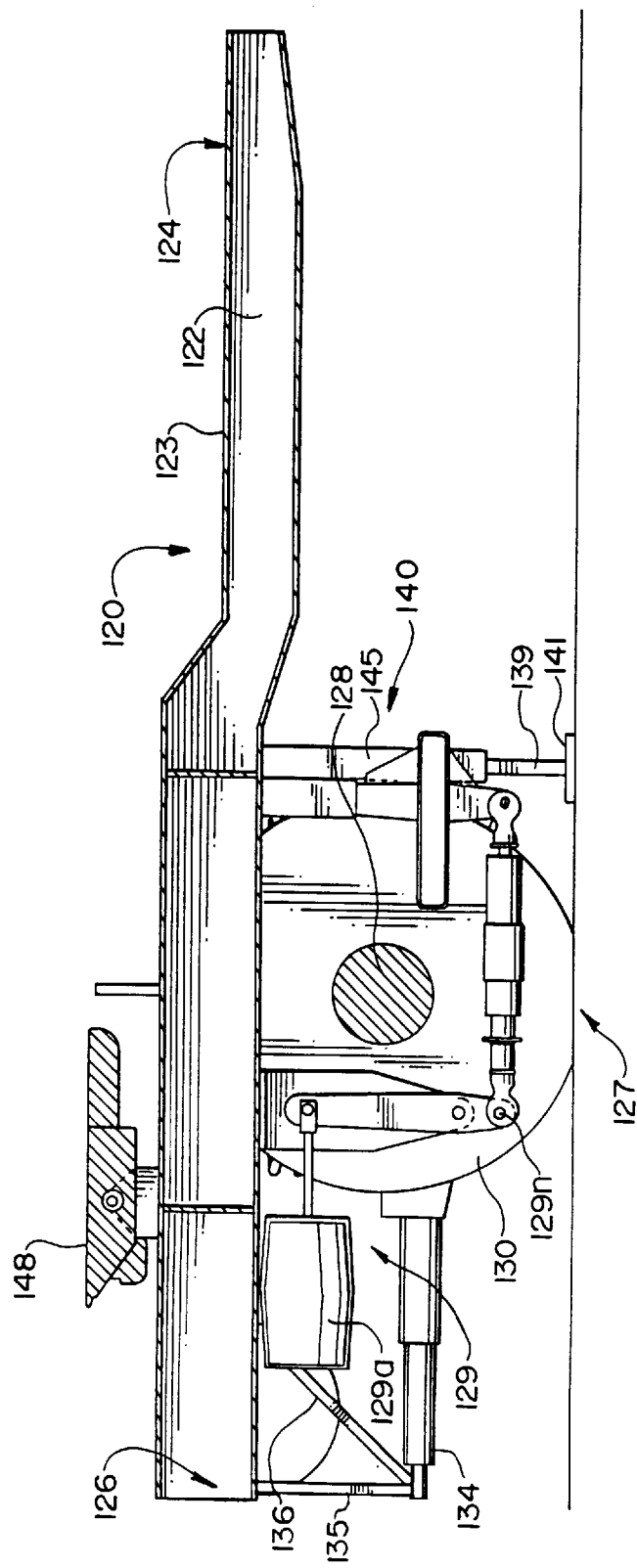

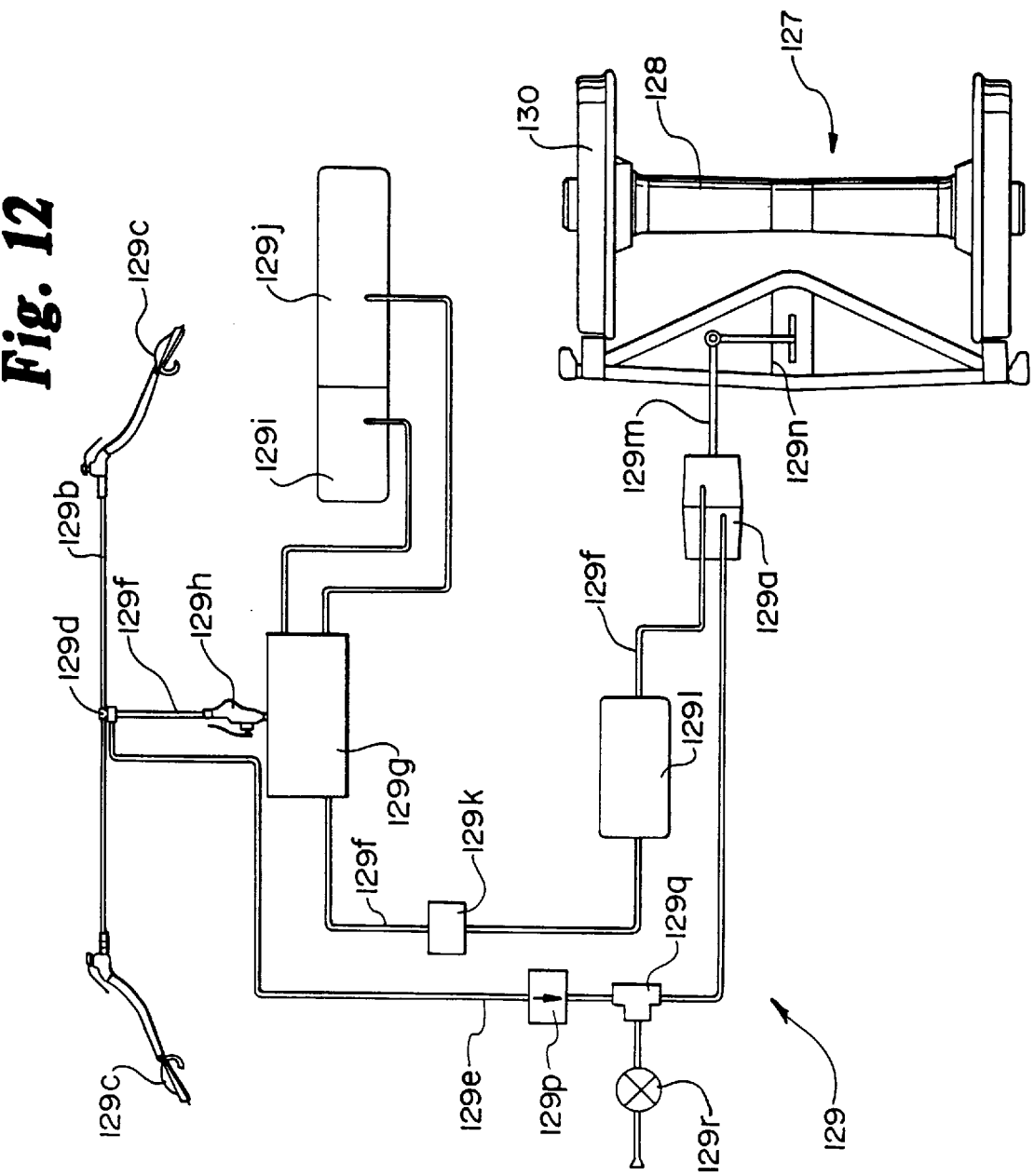

BOGIE COUPLING SYSTEM FOR CONVERTIBLE RAILWAY-RAILROAD VEHICLE

BACKGROUND OF THE INVENTION

The present invention relates generally to bimodal hauling vehicles which can be converted for use on both railways and roadways and to a method for using the vehicles. In particular, the present invention is a bimodal hauling vehicle and associated method of use which permit one operator to convert the vehicle between highway and railway operation at a grade crossing.

The idea of moving one kind of vehicle on another vehicle is not new in North America. Between 1843 and 1854, canal boats were hauled by cog railroad over mountains from one stream to another. During the 1850s and the 1860s, boats were used to haul supplies, horses and wagons of Westward bound pioneers on inland waterways. On festive occasions, Canadian railroads operated special picnic trains hauling passengers and sleighs that were mounted on flat cars. In the United States, the first railway-highway intermodal operations were termed "piggyback" operations. The early piggyback operations consisted mainly of trains hauling farmers wagons. The first piggyback train began operation in 1885 and hauled 16 wagons on eight flat cars. The distance travelled was 20 miles and the savings in time was substantial. As the service became more well known, special cars were built that could haul four wagons each. Passenger service for the owners or drivers of the wagons was furnished in a separate car. The operation only lasted ten years, but it was the beginning of railway-highway intermodal travel in the United States.

The railroad faced two handicaps in competing with motor carriers. First, rail service did not offer the door-to-door pickup and delivery service that was provided by motor carriers, and second, freight in less than carload quantities needed better packaging for shipment by rail than for shipment by motor carrier. Piggyback service was intended to overcome these problems.

In 1926, the Chicago, North Shore and Milwaukee Railroads began hauling railroad-owned highway trailers on flat cars, providing the first modern piggyback service in the United States.

Between 1939 and 1951, the railroads' efforts to expand piggyback service were largely abandoned. The economic pressure on the railroads to increase traffic was greatly relieved by the freight shipments generated by World War II and by the pent-up demand for consumer goods immediately following the end of the war. When the backlog of orders was reduced, rail tonnage again began to decline. Before any action was taken toward increasing piggyback services, however, the Korean War led to an increase in the demand for service to such an extent that railroads did not feel that it was necessary to explore avenues which might yield additional freight tonnage. When rail freight tonnage began to decline in 1952, the railroads again became interested in methods of increasing tonnage, and the search led them to a reappraisal of piggyback service. During the 1950s, piggyback operations expanded rapidly and, by the end of 1959, most of the principal railroads in the United States were providing piggyback service.

Over the years, many methods and designs of piggyback service have been developed. Each, however, is a variation of one of two primary methods. One of these methods involves hauling the complete trailer. The other method involves hauling only the trailer body. The Clejan System is representative of a technique for hauling the complete trailer, while the New York Central Railroad's Flexi-Van Service is representative of a technique for hauling only the trailer body. The Clejan System uses trailers outfitted with special railroad wheel dollies that ride on rails built into specially fitted flatbed cars. The dollies can be either permanently attached to the trailer or detachably mounted with a pin mechanism.. Detachable dollies are put on the trailer using a hydraulic jack to lift the dolly up to the trailer bottom. A pin is used to connect the dolly to the trailer. No tools are needed to connect the dolly to the trailer.

The New York Central Flexi-Van system uses trailers outfitted with detachable sliding rear roadway wheel assemblies. To detach a roadway wheel assembly, the trailer is backed up to a flatbed car that has a hydraulic turntable built into it. The roadway wheel assembly is released and slid forward before the turntable is hydraulically raised. The turntable mechanism lifts the trailer off of the roadway wheels. The trailer is then hauled on a flatbed car.

The search for an easier and less expensive way of carrying more tonnage led to an innovation in intermodal transportation. In the late 1950s, the Chesapeake and Ohio Railroad developed the Rail Van, a bimodal trailer with separate highway and railway axles. The Rail Van was designed to ride directly on the highway or the railway. In the late 1970s, a new trailer was designed with a single rail axle and tandem highway axles. This trailer, designed and built for a company called Road Railer, has a set of non-removable railway wheels located between tandem highway axles. To run on the road, the railway wheels are retracted above the highway wheels. Conversely, to run on rails, the railway wheels are extended below the roadway wheels. One major disadvantage of this system is that the railway wheels are heavy and the weight must be carried at all times. This decreases fuel economy and increases the cost of hauling tonnage over the highway. Road Railer has since introduced a new model in which the railway wheels are detachable.

The Ferrosud, Carro Bimodale System is another bimodal trailer design. It uses a two-axle railway bogie fitted with a locking device to ensure that the bogie and van trailer are correctly joined. On arrival at the roadway-railway transfer site, the pneumatic suspension of the trailer is used to lift the van body to a height above the rail bogie. The waiting bogie is moved under the van, the van is lowered into position, and the railway braking system is connected. The roadway wheels end up above the railroad track. One two-axle bogie is used between two trailers with the back of one trailer mounted on one-half of the bogie and the front of another trailer mounted on the other half of the bogie.

The Viens U.S. Pat. No. 5,009,169 discloses a rail bogie including a platform with railway wheels underneath, a fifth wheel and a hooking lock.

The Larson U.S. Pat. No. 5,220,870 discloses a double-axle bogie pivotally connected to one end of a trailer. The bogie has a vertical post which fits into a socket on the underside of the trailer. This reference also teaches using a retractable roadway tire assembly on the trailer to lift an attached bogie off the ground.

The Wicks et al. U.S. Pat. No. 4,917,020 discloses a transition vehicle with roadway wheels and railway wheels. The transition vehicle contains a clamping mechanism to grasp the sidewalls of a trailer being carried. The roadway wheels are raised during rail use by an air spring suspension system. The transition vehicle can be attached to a road vehicle, another rail car or a train engine. The transition vehicle is also used on the anterior portion of the hauling vehicle, between the moving vehicle and the hauling vehicle.

The Beatty U.S. Pat. No. 4,448,132 discloses a convertible railway-highway vehicle containing railway wheels and highway wheels. The vehicle uses a number of axles for highway wheels to maximize the load it can carry. The highway wheels are on a liftable axle assembly with a locking mechanism. An airbag spring assembly is used to lift the axle assembly. The railway wheels are permanently connected adding additional weight during highway use and increasing the cost for hauling over the highway.

In many areas, such as rural locations and developing countries, railways are a more effective means of transportation than roadways.

Unfortunately, the railway-highway vehicles described above are relatively complicated to operate. Railways therefore tend to be an underutilized mode of transportation for smaller organizations or individuals such as farmers that are not hauling large quantities of goods typically required for the efficient operation of these known bimodal systems.

It is therefore evident that there is a continuing need for improved convertible railway-roadway vehicles. In particular, there is a need for vehicles of this type that can be conveniently converted between railway and roadway operating modes at grade crossings. Vehicles of this type would be especially useful if they can be converted between railway and roadway operating modes by one person, removably attached railway bogies can be stored off a railway near a grade crossing, and the bogies can be moved to and from the railway by a tractor or trailer. To be commercially viable, any such vehicle must be capable of being efficiently manufactured.

SUMMARY OF THE INVENTION

The present invention is directed to bogies and convertible roadway-railway trailers and a method for converting the trailers between roadway use and railway use. One person can conveniently use a tractor to convert the trailers between roadway and railway operating modes at any grade crossing. No special ramps are required, and the removable bogies can be stored at any convenient location.

Each trailer includes a main body with an anterior end and a posterior end, a retractable roadway tire assembly attached to the posterior end, a rigid coupling mechanism at the posterior end and a pivot coupling mechanism at the anterior end. Each bogie includes a frame, a railway wheel assembly, a rigid coupling mechanism at a forward end thereof and a pivot coupling mechanism at a rearward end thereof. The rigid coupling mechanism on the posterior end of the trailer is rigidly coupled to the rigid coupling mechanism at the forward end of the bogie. The pivot coupling mechanism at the anterior end of a trailer is capable of releasably and pivotally coupling the trailer to another vehicle. The pivot coupling mechanism at the rearward end of the bogie is constructed for releasably and pivotally coupling the bogie to the anterior end of another vehicle.

The method by which a tractor is used in conjunction with bogies and convertible roadway-railway trailers of this invention includes configuring a trailer between railway and roadway use. Configuring the trailer for railway use includes operating a tractor while the trailer is on a roadway and bogies are stored off a railway to position the trailer near a bogie, coupling the bogie to the trailer, operating the tractor to position the trailer and the bogie over the railway, and retracting the roadway tires from the railway. Similarly, configuring the trailer for roadway travel includes extending the roadway tires and engaging them with the ground, operating a tractor to remove the trailer and the bogie from the railway and to position the trailer on a roadway, and uncoupling the bogie from the trailer.

BRIEF DESCRIPTION OF THE DRAWINGS

FIG. 1A is a side view of several convertible roadway-railway trailers and bogies in accordance with the present invention configured in railway mode of operation and connected to an engine, forming a train.

FIG. 1B is a side view of several convertible roadway-railway trailers and bogies in accordance with the present invention configured in railway mode of operation and connected to an engine using a special bogie as an interface, forming a train.

FIG. 2 is a side view of one of the trailers of FIG. 1.

FIG. 3 is a bottom view of one of the trailers of FIG. 1.

FIG. 4 is a side view of one of the bogies of FIG. 1.

FIG. 8 is a side view of one of the bogies and two of the trailers of FIG. 1 configured in the railway mode of operation, with the bogie rigidly coupled to a first trailer and pivotally coupled to a second trailer, the railway wheels of the bogie on a railway, and the roadway tires of the first trailer retracted.

FIGS. 9A through 9P illustrate a method in accordance with the present invention of assembling a train of vehicles of the type shown in FIG. 1.

FIG. 11 is a section view along line 11—11 of FIG. 10.

FIG. 12 is a block diagram of the braking system on One of the bogies of FIG. 1.

DETAILED DESCRIPTION

Figure 5:
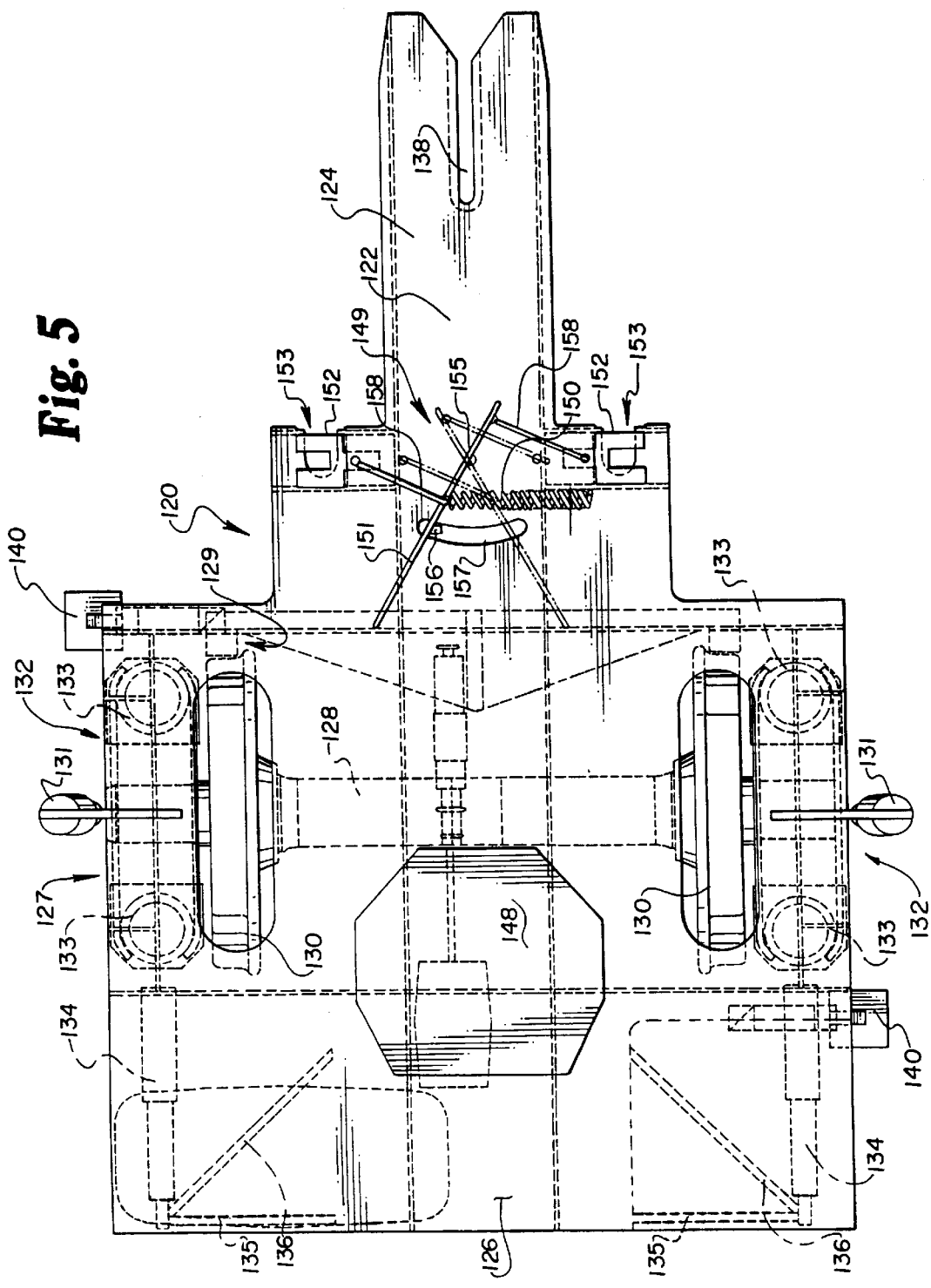
FIG. 5 is a top view of one of the bogies of FIG. 1.

Illustrated in FIGS. 1A and 9A–9P, a train 113 is made of bimodal convertible roadway-railway trailers 160 and bogies 120. Trailers 160 can be used both on a roadway and, in conjunction with bogies 120, on a railway 102. As seen best in FIGS. 9A–9F, a single operator can conveniently use a tractor 114 to convert a trailer 160 between roadway and railway operating modes at any grade crossing. No special ramps are required and the removable bogies 120 can be stored at any convenient location, including storage areas located off the railway 102.

Secured to the bottom 164 of each trailer 160 is a retractable roadway tire assembly 166 operated by an airbag assembly 171 (see FIGS. 2–3). The tractor 114 is used to move a first trailer 160 and to position the posterior end 162 of the trailer 160 over forward end 124 of a first bogie 120, rigidly coupling the first trailer 160 to the first bogie 120 (see FIGS. 9A–9B). The airbag assembly 171 is inflated, extending the roadway tire assembly 166 away from the bottom 164 of the trailer 160 and lifting the bogie 120 off the ground 105 (see FIG. 9C). The tractor 114 is used to move the trailer 160 and the bogie 120 to a position over the railway 102, and then the airbag assembly 171 is deflated. This retracts the roadway tire assembly 166 towards the bottom 164 of the trailer 160 and lowers the bogie 120 onto the railway 102. Additional trailers and bogies can be connected together and positioned on the railway 102 in the manner described above and joined together to form a train 113. The process is reversed to remove each trailer 160 and bogie 120 from a train 113 and to convert each trailer 160 for roadway use. All of this can be done simply by a single operator.

Referring now to FIGS. 2–3, each trailer 160 has a main body 161, an anterior end 163, a posterior end 162 and a bottom 164. A trailer bumper 169 is attached to and transversely extends below the bottom 164 of the trailer 160 at the posterior end 162. Attached to the bumper 169 are lights (not shown). The trailer 160 is fitted with brake piping (not shown) which carries pressurized air for use in operating conventional air brakes (also not shown). Secured to the bottom 164 of the trailer 160 at the posterior end 162 are two parallel longitudinal axle supports 165 which extend below the bottom 164.

A conventional retractable roadway tire assembly 166 is attached to the bottom 164 at the posterior end 162 along the longitudinal axle supports 165. The retractable roadway tire assembly 166 comprises two axles 167 both having two roadway tires 168 at each end thereof, and an airbag assembly 171. The airbag assembly 171, of conventional design, comprises four airbags 170 having springs (not shown) operably secured therein and stabilizing bars 172 secured thereto. All four airbags 170 together support the posterior end 162 on the axles 167. Each airbag 170 is secured at one end thereof to the bottom 164 of the trailer 160 and at the other end thereof to an end of one of the axles 167. A stabilizing bar 172 extends between each set of airbags 170, providing stabilization between the axles 167. When the airbags 170 are inflated, the roadway tires 168 are extended away from the bottom 164, raising the posterior end 162 of the trailer 160. When the airbags 170 are deflated, the springs (not shown) retract the roadway tires 168 towards the bottom 164. The roadway tire assembly 166 can be extended or retracted to any position over its range of extension by inflating or deflating the airbags 170 the desired amount. A conventional pin (not shown) can be used to lock the roadway tire assembly 166 at preset extended or retracted positions for use when the trailer 160 travels over a roadway or a railway, as will be discussed below.

A downwardly oriented center king pin 184 is secured to the bottom 164 in the middle of the roadway tire assembly 166. The center king pin 184 is located equidistant between the sides of the trailer 160 so as to roughly balance the weight of the trailer 160 and its load on either side of the center king pin 184. The location of the center king pin 184 is forwardly offset from the posterior end 162 of the trailer 160, as will be discussed shortly. The center king pin 184 is of conventional design and is constructed for engagement with a V-slot on a bogie. Rearward of the center king pin 184, along the posterior end 162, two downwardly oriented side king pins 185 are secured to the bottom 164. The side king pins 185 are offset from each other and are centered between the sides of the trailer 160. The side king pins 185, also of conventional design, are constructed for engagement with locking king pin slots on a bogie. The center king pin 184 and the side king pins 185 are located at the vertices of a triangle that is approximately equilateral, providing the posterior end 162 of the trailer 160 with multiple spaced-apart connecting mechanisms. These three king pins are constructed and arranged for rigidly coupling the trailer 160 to a bogie, functioning as a trailer rigid coupling mechanism.

At the anterior end 163 of the trailer 160, a downwardly oriented pivot coupling king pin 192 is secured to the bottom 164 equidistant between the sides of the trailer 160. The pivot coupling king pin 192 is of conventional design and is constructed for engagement with a fifth wheel for pivotally coupling the trailer 160 to a second bogie, an engine or a tractor. The pivot coupling king pin 192 functions as a trailer pivot coupling mechanism.

Rearward of the pivot coupling king pin 192, at the anterior end 163, the trailer 160 has conventional landing gear 174 secured to the bottom 164. The landing gear 174, when lowered, supports the anterior end 163 of the trailer 160.

Referring now also to FIGS. 4, 5, 10 and 11, each bogie 120 includes a metal frame 122 having a narrow forward end 124 and a rearward end 126. The forward end 124 is at a lower height than the rest of the frame 122 (see FIGS. 4 and 11) because the forward end 124 is designed to fit beneath the bumper 169 on the posterior end 162 of a trailer 160, while the rearward end 126 is designed to fit beneath the anterior end 163 of a trailer 160 which does not have a bumper on the bottom 164 thereof.

A railway wheel assembly 127 is located underneath the frame 122 approximately midway between the forward end 124 and the rearward end 126 and is secured thereto for supporting the frame 122 for motion. The railway wheel assembly 127 comprises an air braking system 129 and a lightweight yet sturdy suspension 132. The suspension 132 is connected to and supports an axle 128 with railway wheels 130 at each end thereof. The suspension 132 comprises a pair of vertically oriented coil springs 133 at each of the axle 128 which extend between the axle 128 and the underside of the frame 122. To further support and absorb lateral and longitudinal shock, two sets of dampers, comprising conventional shock absorbers, are provided. A pair of vertical dampers 131 extend upwardly from the opposite ends of the axle 128 and are secured to the frame 122. A pair of longitudinal dampers 134 extend rearwardly from the opposite ends of the axle 128 and are each secured to both a first and second set of stabilizing bars 135 and 136. The first set of stabilizing bars 135 are secured to the very end of the rearward end 126 of the frame 122 and extend outwardly and downwardly therefrom to the longitudinal dampers 134. The second set of stabilizing bars 136 are secured to the rearward end 126 of the frame 122 forward of the very end of the frame 122 and extend outwardly, downwardly and rearwardly to the longitudinal dampers 134. The two sets of stabilizing bars 135 and 136 serve as rigid extensions of the frame 122 which allow for the longitudinal dampers 134 to be oriented in a horizontal position parallel to the frame 122 so as to provide for maximum absorption of longitudinal shock.

As is best seen in the FIG. 12, the braking system 129 comprises standard freight railcar brake equipment in conjunction with a standard semi-trailer brake air cylinder 129a. The air cylinder 129a is a double-acting hydraulic cylinder having two chambers separated by a piston 129m. The first chamber is for a main braking subsystem and a second chamber is for a parking braking subsystem, as is described below.

The external air brake line from a trailer (not shown) is coupled to the signal air line 129b of the bogie 120 through a glad hand 129c. A second glad hand 129c is provided to allow for coupling the signal air line 129b to a second trailer when forming a train. A split-off valve 129d splits the air flow from the signal air line 129b into a parking brake line 129e and a regular braking line 129f. The regular braking line 129f extends to a standard freight railcar brake valve 129g via a dirt collector and cut out cock 129h.

The brake valve 129g is configured in a conventional manner, having air inputs coupled by air hoses to an auxiliary reservoir 129i and an emergency reservoir 129j. The main braking line 129f couples the brake valve 129g to the first chamber of the air cylinder 129a with air hoses which pass through an empty/load valve 129k and an equalizing volume chamber 129l. When the pressure in the signal air line 129b drops, the brake valve 129g allows air to flow from the auxiliary reservoir 129i through the brake valve 129g and to the first chamber of the air cylinder 129a. If the pressure in the signal air line 129b drops substantially, indicating that hard braking is desired,. the brake valve 129g also allows air to flow from the emergency reservoir 129j, increasing the air flow and air pressure to the first chamber of the air cylinder 129a. The empty/load valve 129k operates to adjust the air pressure, and thus the braking power, to the first chamber of the air cylinder 129a depending on whether the bogie 120 has an empty or a full load. Because the air cylinder 129a is a standard semi-trailer air brake cylinder while the other components, notably the auxiliary reservoir 129i and the emergency reservoir 129j, are standard freight railcar pieces which have a much larger volume, the equalizing volume chamber 129l is used to reduce the air pressure to the first chamber of the air cylinder 129a.

The air cylinder 129a has a piston 129m which is connected to and actuates a braking mechanism 129n. As the pressure in the main braking line 129f and the first chamber of the air cylinder 129a rises, the air cylinder 129a engages and extends the piston 129m. This causes the braking mechanism 129n to engage the railway wheels 130 and apply braking force to the bogie 120.

In addition to the main braking subsystem described above, the braking system 129 also has a parking brake subsystem. The parking brake line 129e extends from the split-off valve 129d to a one-way check valve 129p which allows air to flow only in the direction from the split-off valve 129d. The parking brake line 129e extends from the one-way check valve 129p to a tee 129q which splits the parking brake line 129e into two branches. The first branch of the parking brake line 129e is coupled to the second chamber of the air cylinder 129a. Unlike the first chamber of the air cylinder 129a where the piston 129m extends when air pressure increases, a decrease in the air pressure in the second chamber of the air cylinder 129a causes the piston 129m to extend and engage the braking mechanism 129n. The one-way check valve 129p prevents air pressure to the second chamber of the air cylinder 129a from dropping when the pressure in the signal line 129d is falls. The second branch of the parking brake line 129e couples the tee 129q to a bait cock 129r which, when opened, releases air into the atmosphere. This reduces pressure in the parking brake line 129e to the second chamber of the air cylinder 129a, thereby engaging the parking brake.

Returning primarily to FIGS. 4 and 11, a bogie landing gear 140 is secured to the underside of the frame 122 for supporting the frame 122 of the bogie 120 in a horizontal position. The bogie landing gear 140 comprises two downwardly and outwardly angled landing gear tubes 145, one secured to the frame 122 forward of one railway wheel 130 and the other secured rearward of the opposite railway wheel 130. A telescoping landing gear end 139 slides into and out of each landing gear tube 145 and can be locked into place using a conventional release lever (not shown). Secured to the bottom end of each telescoping landing gear end 139 is a foot plate 141 adapted to resting on the ground. The bogie landing gear 140 is lowered when the bogie 120 is to be stored and is raised when the bogie 120 is to be moved or is connected to a trailer 160.

Referring now primarily to FIG. 5, the forward end 124 of the bogie 120 has a longitudinal V-slot 138 at the center thereof with a wide forward facing opening and a narrow channel having parallel sides. The V-slot 138 is designed to receive and hold in place the downwardly oriented center king pin 184 on a trailer 160. The wide opening on the V-slot 138 facilitates the alignment of the center king pin 184 with the V-slot 138 and the insertion therein.

Also on the forward end 124, offset rearwardly from the V-slot 138, are two forward facing locking side king pin slots 153. The locking side king pin slots 153 are laterally offset from each other and are designed to received and lock into place the side king pins 185 on a trailer 160. The relative positions of the V-slot 138 and the locking side king pin slots 153 correspond to the relative positions of the center king pin 184 and the side king pins 185 on the bottom 164 of a trailer 160. The V-slot 138 and the locking side king pin slots 153 are located at the vertices of a triangle that is approximately equilateral, providing the forward end 124 of the bogie 120 with multiple spaced-apart connecting mechanisms. These three slots are constructed and arranged for rigidly coupling the bogie 120 to a trailer 160, functioning as a bogie rigid coupling mechanism.

The locking side king pin slots 153 have a locking mechanism 149 designed to lock the side king pins 185 into the locking side king pin slots 153. Each locking side king pin slot 153 comprises a forward facing half-oval opening sized to receive a side king pin 185 and a U-clamp 152 which slides laterally outwardly from the center of the frame 122 and holds a king pin in the middle of the "U" part of the U-clamp 152. The U-clamp 152 surrounds the side king pins 185 on the forward, inward and rearward sides, and the frame 122 blocks the outward side and also keeps the U-clamp 152 from being pulled forward. When the U-clamps 152 are slid laterally outwardly, the side king pins 185 sitting in the locking side king pin slots 153 are locked into place.

A locking lever 151 is pivotally connected to the frame 122 about a pivot point 155 midway between the locking side king pin slots 153. On each side of the pivot point 155, a locking lever engagement bar 158 pivotally connects the locking lever 151 to one of the U-clamps 152. The frame 122 has a curved slot 157 through which an extension 156 on the lower part of the locking lever 151 passes, limiting the range of motion of the locking lever 151. A spring 150 secured to the frame 122 and the locking lever 151 biases the locking lever 151 so as to keep the U-clamps 152 in a closed position. By moving the locking lever 151, the locking lever engagement bars 158 laterally slide the U-clamps 152 to unlock and lock the locking side king pin slots 153. A conventional pin (not shown) can be used to keep the locking lever 151 in an open (unlocked) or a closed (locked) position. The unlocked position is shown in phantom in FIG. 5.

Figure 6:
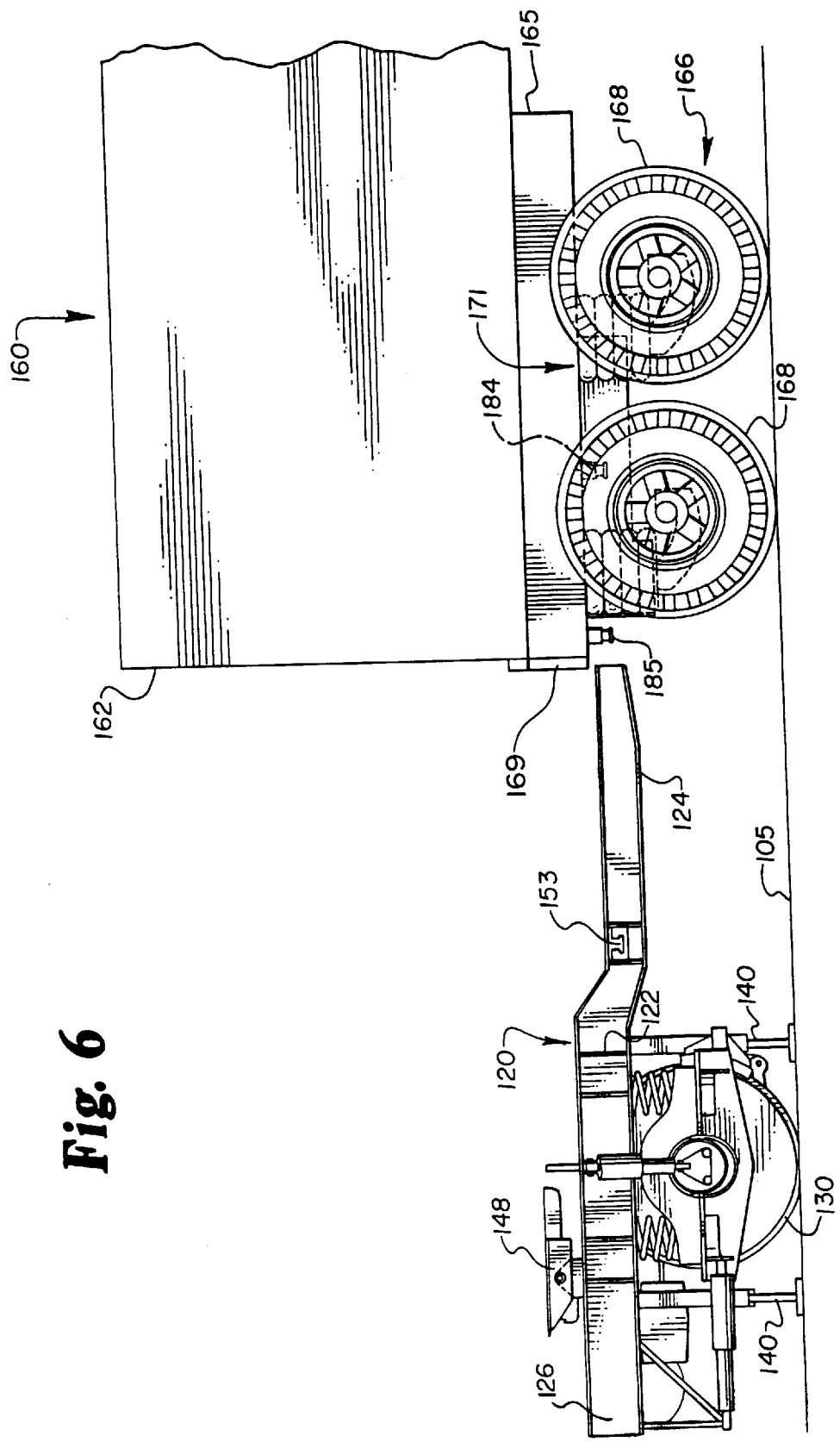
FIG. 6 is a side view of one of the bogies and one of the trailers of FIG. 1, shown in the process of converting from roadway mode of operation to rail ay mode of operation.
Figure 7:
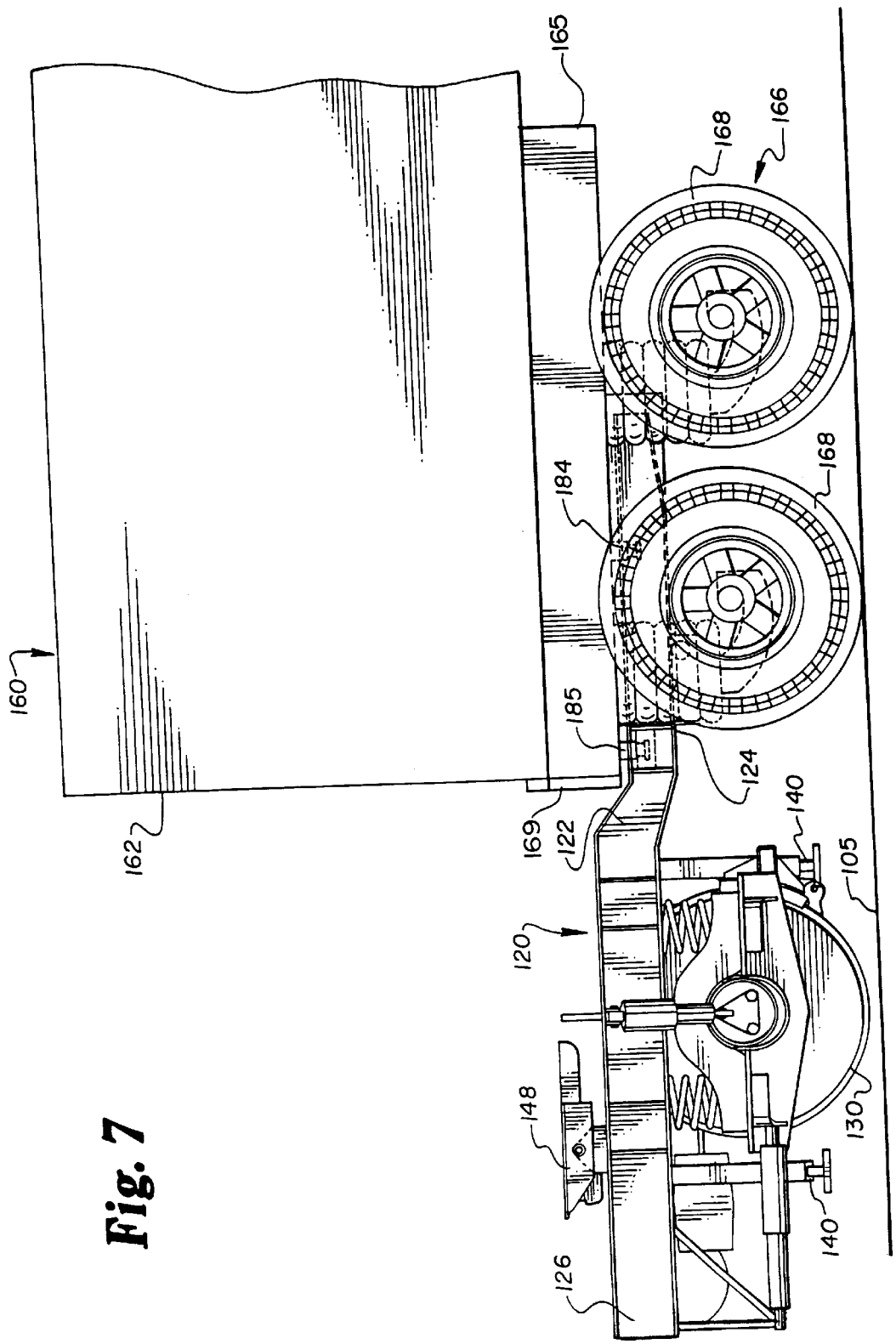
FIG. 7 is a side view of one of the bogies and one of the trailers of FIG. 1, shown in the process of converting from roadway mode of operation to railway mode of operation, with the bogie rigidly coupled to the trailer, the roadway tires of the trailer on the ground, and the bogie lifted off the ground.
Figure 10:
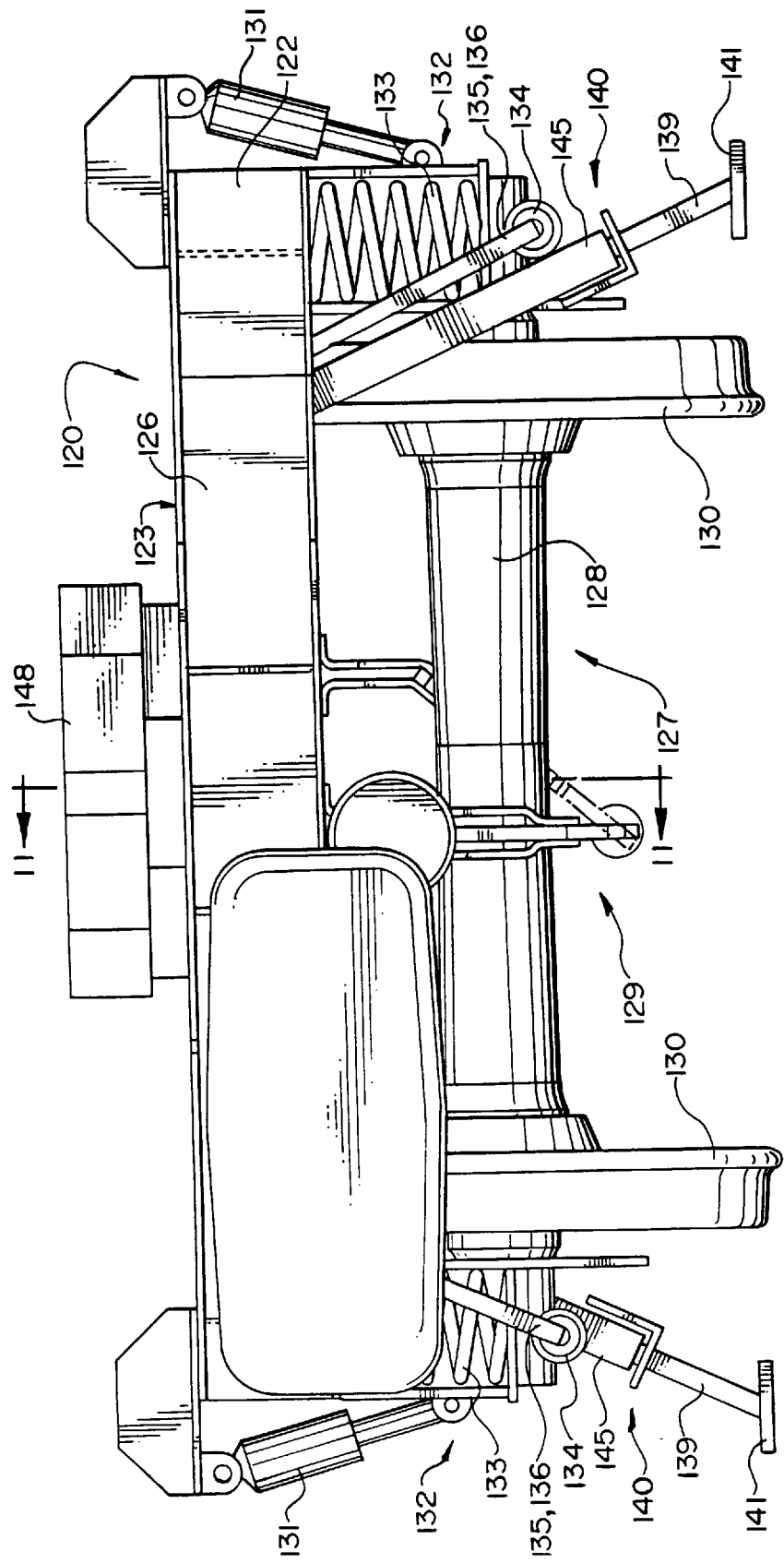
FIG. 10 is a back view of one of the bogies of FIG. 1.

Referring now primarily to FIGS. 5–7, when an operator uses a tractor to rigidly couple a trailer 160 to a bogie 120, the operator first opens the locking lever 151 and uses the conventional pin (not shown) to keep the locking lever 151 open (or checks to see that the locking level 151 has already been opened). The operator uses the tractor to back up the trailer 160 over the forward end 124 of the bogie 120, inserting the center king pin 184 on the trailer 160 into the V-slot 138 on the bogie 120 and the side king pins 185 in the locking side king pin slots 153. The operator then closes and pins shut the locking lever 151, thereby -moving the U-clamps 152 laterally outwardly and lockingly engaging the side king pins 185 into the locking side king pin slots 153. These spaced-apart connecting mechanisms rigidly couple the trailer 160 to the bogie 120, maintaining the trailer 160 and the bogie 120 in fixed positions relative to each other. Furthermore, this rigid coupling allows the trailer 160 to lift the bogie 120 when the airbag assembly 171 is inflated and the roadway tires 168 are extended away from the bottom 164, as is shown in FIG. 7. Alternatively, as shown in FIG. 8, when the roadway tires 168 are retracted towards the bottom 164, the railway wheels 130 support both the bogie 120 and the posterior end 162 of the trailer 160.

Referring now primarily to FIGS. 4, 5 and 8, a fifth wheel 148 of conventional design is pivotally mounted on the upper surface 123 of the frame 122 at the rearward end 126 of the bogie 120. The fifth wheel 148 is designed for receiving and lockingly engaging a pivot coupling king pin 192' on a second trailer 160'. When this connection is made, the bogie 120 is pivotally coupled to the second trailer 160'. Because there is only one point of connection between the bogie 120 and the second trailer 160', the second trailer 160' is free to pivot relative to the bogie 120, allowing a train of trailers and bogies to bend when going around curves.

Referring now to FIGS. 9A–9P, using a tractor 114, a single operator can convert a trailer 160 and a bogie 120 into an intermodal railroad car and connect several intermodal railroad cars together to form a train 113. As shown in FIG. 9A, a tractor 114 is connected to a first trailer 160 and is driven close to a first bogie 120. The bogies are stored off track, near a grade crossing, minimizing cost and effort need to set up a transfer point. The landing gear 140 on the bogies are in a lowered position, keeping the bogies from tipping over. The locking side king pin slots 153 are opened.

As shown in FIG. 9B, an operator uses the tractor 114 to back up the first trailer 160 over the forward end 124 of the first bogie 120. Because bogies are small relative to trailers, it is helpful to center the bogies between two indicators so as to assist the operator of the tractor in aligning the trailer 160 over the bogie 120. The retractable roadway tire assembly 166 might need to be partially retracted or extended so that the bottom 164 of the first trailer 160 and the forward end 124 of the first bogie 120 are at the same height.

As the trailer 160 is backed up, the center king pin 184 enters in the V-slot 138 and the side king pins 185 enter the locking side king pin slots 153. The operator uses the locking lever 151 to move the U-clamps 152 laterally outwardly and lockingly engage the side king pins 185 in the locking side king pin slots 153 (see FIG. 5). Hoses for the braking system on the first bogie 120 are connected to the brake piping (not shown) of the first trailer 160.

As shown in FIG. 9C, the landing gear 140 on the first bogie 120 is raised, and the airbag assembly 171 is operated to extend the roadway tires 168 and lift the first bogie 120 off the ground 105. As shown in FIG. 9D, the tractor 114 is operated to move the first trailer 160 and the first bogie 120 to a position over a railway 102.

The airbag assembly 171 is deflated, as is shown in FIG. 9E, lowering the posterior end 162 of the first trailer 160 and the first bogie 120 and engaging the railway wheels 130 on the first bogie 120 with the railway 102. As is shown in FIG. 9F, the airbag assembly 171 is further deflated, retracting the roadway tires 168. At this point the airbag assembly 171 is locked in place using the conventional locking pin (not shown).

As shown in FIGS. 9G–9H, the landing gear 174 at the anterior end 163 of the first trailer 160 is lowered, and the tractor 114 is uncoupled from the first trailer 160 and driven away.

This process is repeated for placing subsequent trailers and bogies onto the railway 102. As shown in FIGS. 9I–9J, a tractor 114', either the same tractor or a different one as before, is used to move a second trailer 160' and a second bogie 120' onto the railway 102. The airbag assembly 171' on the second bogie 120' is operated, engaging the railway wheels 130' with the railway 102 and retracting the roadway tires 168'. The tractor 114' backs up the second trailer 160' and the second bogie 120' to the anterior end 163 of the first trailer 160. The pivot coupling king pin 192 on the anterior end 163 of the first trailer 160 is engaged with the fifth wheel 148' of the second bogie 120' and is lockingly engaged therein, pivotally coupling the second bogie 120' to the first trailer 160. The hoses for the braking system on the second bogie 120' (not shown) are connected to the brake piping (not shown) of the first trailer 160.

As shown in FIGS. 9K, the landing gear 174 on the first trailer 160 is raised. To make room on the railway 102 for more trailers to be added near the grade crossing, as is shown in FIG. 9L, the tractor 114' is used to back up all of the bogies and trailers along the railway 102.

As shown in FIGS. 9M–9N, the landing gear 174' on the second trailer 160' is lowered, and the tractor 114' is uncoupled from the second trailer 160' and driven away. This process is repeated for all of the trailers to be connected together, forming a train 113.

As shown in FIG. 9O, a locomotive engine 112 having a fifth wheel 111 on a back end thereof is coupled to the pivot coupling king pin 192" on the anterior end 163" of a last trailer 160" at the front of the train 113. The engine 112 could be a conventional train locomotive which has been modified to have a fifth wheel 111, a Brandt Road Rail Power Unit manufactured by Brandt Industries Ltd., a puller as described in commonly owned U.S. Patent application Ser. No. 08/054,906, or any other type of locomotive power, either directly or through a special bogie 120x having a fifth wheel at one end and a standard railroad coupling mechanism at the other end, as is shown in FIG. 1B. As shown in FIG. 9P, the landing gear 174" on the last trailer 160" is raised and the train 113 is ready to be used on the railway 102.

The process for disassembling a train 113 of trailers and bogies is similar. The landing gear 174' at the anterior end 163' of a first trailer 160' (located at the front of the train 113) is lowered, and an engine 112 is uncoupled. A tractor 114' backs up to the anterior end 163' of the first trailer 160', and a fifth wheel 117' on the tractor 114' lockingly engages the pivot coupling king pin 192' on the anterior end 163' of the first trailer 160'. The landing gear 174' on the first trailer 160' is raised, and the train 113 can be pulled forwards. The landing gear 174 on a second trailer 160 located behind the first trailer 160' is lowered. A first bogie 120' is uncoupled from the second trailer 160, and the tractor 114' pulls the first trailer 160' and the first bogie 120' away from the second trailer 160 and the rest of the train 113. The roadway tires 168' on the first trailer 160' are extended, raising the first bogie 120' off the railway 102. The tractor 114' pulls the first trailer 160' and the first bogie 120' to a storage area located off the tracks 102 and near a grade crossing. The roadway tires 168' on the first trailer 160' are retracted, lowering the first bogie 120' to the ground 105. The landing gear 140' on the first bogie 120' is extended and the first bogie 120' is uncoupled from the first trailer 160'. The tractor 114' pulls the first trailer 160' away from the first bogie 120', leaving it in the storage area. This process is repeated to remove all of the trailers from the railway 102 and leave all of the bogies in the storage area.

The preferred embodiment has been described as an example of the invention as claimed. However, the present invention should not be limited in its application to the details illustrated in the description of the preferred embodiment and in the accompanying drawings since the invention may be practiced or constructed in a variety of different embodiments. Also, it must be understood that the terminology and descriptions employed herein are used solely for purpose of describing the general operation of the preferred embodiment and therefore should not be construed as limitations on the operability of the invention.

What is claimed is:

1. A vehicle comprising a first bogie for coupling a first and a second convertible roadway-railway trailer and for supporting the trailers for transportation over a railway, said bogie comprising:

a frame having a forward end and a rearward end;

a single axle railway wheel assembly mounted on the frame for supporting the frame for motion on the railway;

a bogie rigid coupling mechanism located on the forward end of the frame constructed and arranged for releasably and rigidly coupling the bogie to the first trailer, such that when the bogie is rigidly coupled to the first trailer, the bogie is in a fixed position relative to the first trailer and can support the first trailer; and a bogie pivot coupling mechanism located on the rearward end of the frame constructed and arranged for releasably and pivotally coupling the bogie to the second trailer, such that when the bogie is pivotally coupled to the second trailer, the bogie can pivot relative to the second trailer and can support the second trailer.

2. The vehicle of claim 1 wherein the bogie rigid coupling mechanism includes at least two spaced-apart connecting mechanisms for rigidly coupling the bogie to the first trailer.

3. The vehicle of claim 2 wherein the bogie is configured for use with the first trailer having king pins and the bogie rigid coupling mechanism comprises at least two king pin engagement mechanisms constructed for receiving and engaging the king pins.

4. The vehicle of claim 3 wherein the bogie rigid coupling mechanism comprises two king pin engagement mechanisms each having a locking mechanism for receiving and lockingly engaging the king pins.

5. The vehicle of claim 4 wherein the bogie rigid coupling mechanism further comprises a third king pin engagement mechanism constructed for receiving and engaging one of the king pins.

6. The vehicle of claim 5 wherein the two king pin engagement mechanisms have locking mechanisms that are laterally offset from each other and the third king pin engagement mechanism is longitudinally offset from the other two king pin engagement mechanisms.

7. The vehicle of claim 1 wherein the bogie pivot coupling mechanism comprises a fifth wheel pivotally mounted on the rearward end of the frame.

8. The vehicle of claim 1 further comprising a first trailer convertible between roadway and railway modes of operation, said first trailer comprising:

a main body having a first end, a second end and a bottom;

a retractable roadway tire assembly mounted on the bottom at one end;

a trailer rigid coupling mechanism located on the first end of the first trailer constructed and arranged for releasably and rigidly coupling the first trailer to the first bogie having a single axle railway wheel assembly, such that when the first trailer is rigidly coupled to the first bogie, the first trailer is in a fixed position relative to the first bogie so that the first bogie can be raised off the ground when the roadway tire assembly on the first trailer is extended, and the first bogie can support the first trailer when the roadway tire assembly is retracted; and a trailer pivot coupling mechanism located on the second end of the first trailer constructed and arranged for releasably and pivotally coupling the first trailer to a second vehicle, such that when the first trailer is pivotally coupled to the second vehicle, the first trailer can pivot relative to the second vehicle;

wherein the bogie rigid coupling mechanism is coupled to the trailer rigid coupling mechanism forming a rigid connection between the first trailer and the first bogie so that the first bogie can be raised off the ground when the roadway tire assembly on the first trailer is extended and the first bogie can support the first trailer when the roadway tire assembly is retracted.

9. The vehicle of claim 8 wherein:

the bogie rigid coupling mechanism has at least two spaced-apart connecting mechanisms; and the trailer rigid coupling mechanism has at least two spaced-apart connecting mechanisms respectively engaged with the spaced-apart connecting mechanisms of the bogie rigid coupling mechanism.

10. The vehicle of claim 8, wherein:

the bogie rigid coupling mechanism comprises at least two king pin engagement mechanisms constructed for receiving the king pins; and the trailer rigid coupling mechanism comprises at least two king pins rigidly mounted on the first end of the first trailer, wherein the king pins are releasably engaged with the respective engagement mechanisms on the first bogie.

11. The vehicle of claim 10 wherein:

the bogie rigid coupling mechanism comprises two king pin engagement mechanisms having locking mechanisms; and the trailer rigid coupling mechanism comprises two king pins rigidly mounted on the first end of the first trailer, wherein the king pins are releasably and lockingly engaged with the respective king pin engagement mechanisms on the first bogie.

12. The vehicle of claim 16 wherein:

the bogie rigid coupling mechanism further comprises a third king pin engagement mechanism; and the trailer rigid coupling mechanism further comprises a third king pin rigidly mounted on the first end of the first trailer, wherein the third king pin is releasably engaged with the third king pin engagement mechanism on the first bogie.

13. The vehicle of claim 12 wherein:

the two king pin engagement mechanisms have locking mechanisms that are laterally offset from each other and the third engagement mechanism is longitudinally offset from the other two king pin engagement mechanisms; and the first two king pins are laterally offset from each other and the third king pin is longitudinally offset from the first two king pins.

14. The vehicle of claim wherein the bogie pivot coupling mechanism comprises a fifth wheel pivotally mounted on the rearward end of the frame and the trailer pivot coupling mechanism comprises a pivot coupling king pin rigidly mounted on the bottom of the first trailer at the second end.

15. A vehicle comprising a first bogie for coupling a first and a second convertible roadway-railway trailer and for supporting the trailers for transportation over a railway, said bogie comprising:

a frame having a forward end and a rearward end;

a railway wheel assembly mounted on the frame for supporting the frame for motion on the railway;

a bogie rigid coupling mechanism located on the forward end of the frame constructed and arranged for releasably and rigidly coupling the bogie to the first trailer having a retractable roadway tire assembly mounted at one end thereof, such that when the bogie is rigidly coupled to the first trailer, the bogie is in a fixed position relative to the first trailer so that the bogie can be raised off the ground when the roadway tire assembly on the first trailer is extended, and the bogie can support the first trailer when the roadway tire assembly is retracted; and a bogie pivot coupling mechanism located on the rearward end of the frame constructed and arranged for releasably and pivotally coupling the bogie to the second trailer, such that when the bogie is pivotally coupled to the second trailer, the bogie can pivot relative to the second trailer and can support the second trailer.

16. The vehicle of claim 15 wherein the bogie rigid coupling mechanism includes at least two spaced-apart connecting mechanisms for rigidly coupling the bogie to the first trailer.

17. The vehicle of claim 16 wherein the bogie is configured for use with the first trailer having king pins and the bogie rigid coupling mechanism comprises at least two king pin engagement mechanisms constructed for receiving and engaging the king pins.

18. The vehicle of claim wherein the bogie rigid coupling mechanism comprises two king pin engagement mechanisms each having a locking mechanism for receiving and lockingly engaging the king pins.

19. The vehicle of claim 18 wherein the bogie rigid coupling mechanism further comprises a third king pin engagement mechanism constructed for receiving and engaging one of the king pins.

20. The vehicle of claim 19 wherein the two king pin engagement mechanisms have locking mechanisms that are laterally offset from each other and the third king pin engagement mechanism is longitudinally offset from the other two king pin engagement mechanisms.

21. The vehicle of claim 15 wherein the bogie pivot coupling mechanism comprises a fifth wheel pivotally mounted on the rearward end of the frame.

22. The vehicle of claim 15 further comprising a first trailer convertible between roadway and railway modes of operation, said first trailer comprising:

a main body having a first end, a second end and a bottom;

a retractable roadway tire assembly mounted on the bottom at one end;

a trailer rigid coupling mechanism located on the first end of the first trailer constructed and arranged for releasably and rigidly coupling the first trailer to the first bogie having a single axle railway wheel assembly, such that when the first trailer is rigidly coupled to the first bogie, the first trailer is in a fixed position relative to the first bogie so that the first bogie can be raised off the ground when the roadway tire assembly on the first trailer is extended, and the first bogie can support the first trailer when the roadway tire assembly is retracted; and a trailer pivot coupling mechanism located on the second end of the first trailer constructed and arranged for releasably and pivotally coupling the first trailer to a second vehicle, such that when the first trailer is pivotally coupled to the second vehicle, the first trailer can pivot relative to the second vehicle;

wherein the bogie rigid coupling mechanism is coupled to the trailer rigid coupling mechanism forming a rigid connection between the first trailer and the first bogie so that the first bogie can be raised off the ground when the roadway tire assembly on the first trailer is extended and the first bogie can support the first trailer when the roadway tire assembly is retracted.

23. The vehicle of claim 22 wherein:

the bogie rigid coupling mechanism has at least two spaced-apart connecting mechanisms; and the trailer rigid coupling mechanism has at least two spaced-apart connecting mechanisms respectively engaged with the spaced-apart connecting mechanisms of the bogie rigid coupling mechanism.

24. The vehicle of claim 23 wherein:

the bogie rigid coupling mechanism comprises at least two king pin engagement mechanisms constructed for receiving the king pins; and the trailer rigid coupling mechanism comprises at least two king pins rigidly mounted on the first end of the first trailer, wherein the king pins are releasably engaged with the respective engagement mechanisms on the first bogie.

25. The vehicle of claim 24 wherein:

the bogie rigid coupling mechanism comprises two king pin engagement mechanisms having locking mechanisms; and the trailer rigid coupling mechanism comprises two king pins rigidly mounted on the first end of the first trailer, wherein the king pins are releasably and lockingly engaged with the respective king pin engagement mechanisms on the first bogie.

26. The vehicle of claim 25 wherein:

the bogie rigid coupling mechanism further comprises a third king pin engagement mechanism; and the trailer rigid coupling mechanism further comprises a third king pin rigidly mounted on the first end of the first trailer, wherein the third king pin is releasably engaged with the third king pin engagement mechanism on the first bogie.

27. The vehicle of claim 26 wherein:

the two king pin engagement mechanisms have locking mechanisms that are laterally offset from each other and the third engagement mechanism is longitudinally offset from the other two king pin engagement mechanisms; and the first two king pins are laterally offset from each other and the third king pin is longitudinally offset from the first two king pins.

28. The vehicle of claim 22 wherein the bogie pivot coupling mechanism comprises a fifth wheel pivotally mounted on the rearward end of the frame and the trailer pivot coupling mechanism comprises a pivot coupling king pin rigidly mounted on the bottom of the first trailer at the second end.

* * * * *

UNITED STATES PATENT AND TRADEMARK OFFICE
CERTIFICATE OF CORRECTION

PATENT NO. : 5,826,517
DATED : October 27, 1998
INVENTOR(S) : Ernest J. Larson et al.

It is certified that error appears in the above-indentified patent and that said Letters Patent is hereby corrected as shown below:

Column 12, line 29, delete "8" and insert therefor --9--

Column 12, line 48, delete "16" and insert therefor --11--

Column 12, line 66, after the word "claim" insert --8--

Column 13, line 38, after the word "claim" insert --17--.

Signed and Sealed this

Twenty-third Day of March, 1999

Attest:

Q. TODD DICKINSON

Attesting Officer

Acting Commissioner of Patents and Trademarks